(12) United States Patent
Jayakumar

(10) Patent No.: US 8,335,157 B2
(45) Date of Patent: Dec. 18, 2012

(54) ADAPTIVE QUEUE-MANAGEMENT

(75) Inventor: Lenard John Stephan Jayakumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 12/781,209

(22) Filed: May 17, 2010

(65) Prior Publication Data

US 2011/0280125 A1    Nov. 17, 2011

(51) Int. Cl.
    *G01R 31/08*    (2006.01)
(52) U.S. Cl. ...................................................... 370/230
(58) Field of Classification Search .................. 370/203, 370/204–215, 229–240, 310–337, 338–350, 370/351–394, 395.1, 395.3, 395.4, 395.41, 370/395.42, 395.5, 395.52, 395.53, 412–421, 370/431–457, 458–463, 464–497, 498–522, 370/523–520, 521–529
    See application file for complete search history.

(56) References Cited

U.S. PATENT DOCUMENTS

| | | | |
|---|---|---|---|
| 5,864,540 A | 1/1999 | Bonomi et al. | |
| 6,130,878 A | 10/2000 | Charny | |
| 6,147,970 A | 11/2000 | Troxel | |
| 6,314,110 B1 | 11/2001 | Chin et al. | |
| 6,317,438 B1 * | 11/2001 | Trebes, Jr. ..................... | 370/466 |
| 6,408,005 B1 | 6/2002 | Fan et al. | |
| 6,529,498 B1 * | 3/2003 | Cheng ............................ | 370/351 |
| 6,542,500 B1 * | 4/2003 | Gerszberg et al. ............. | 370/354 |
| 6,769,000 B1 * | 7/2004 | Akhtar et al. .................. | 1/1 |
| 6,788,688 B2 * | 9/2004 | Trebes, Jr. ................. | 370/395.1 |
| 6,801,940 B1 * | 10/2004 | Moran et al. .................. | 709/224 |
| 6,850,533 B2 * | 2/2005 | Gerszberg et al. ............. | 370/401 |
| 6,978,206 B1 * | 12/2005 | Pu et al. ......................... | 701/446 |
| 7,010,607 B1 * | 3/2006 | Bunton ........................... | 709/228 |
| 7,043,357 B1 * | 5/2006 | Stankoulov et al. .......... | 701/446 |
| 7,079,499 B1 * | 7/2006 | Akhtar et al. .................. | 370/310 |
| 7,299,277 B1 * | 11/2007 | Moran et al. .................. | 709/224 |
| 7,406,088 B2 * | 7/2008 | Magd et al. .................... | 370/401 |
| 7,417,995 B2 * | 8/2008 | Rabie et al. .................... | 370/401 |
| 7,467,198 B2 * | 12/2008 | Goodman et al. ............. | 709/223 |
| 7,564,790 B2 | 7/2009 | Burns et al. | |
| 7,684,426 B2 * | 3/2010 | Narvaez et al. ................ | 370/419 |
| 7,835,323 B2 * | 11/2010 | Lee et al. ....................... | 370/330 |
| 7,843,820 B2 * | 11/2010 | Lai et al. ........................ | 370/230 |
| 7,898,947 B2 * | 3/2011 | Briscoe et al. ................. | 370/230 |
| 7,970,010 B2 * | 6/2011 | Denney et al. ................ | 370/468 |
| 8,023,429 B2 * | 9/2011 | Briscoe et al. ................ | 370/252 |
| 2005/0157750 A1 * | 7/2005 | Rabie et al. .................... | 370/466 |
| 2005/0169279 A1 * | 8/2005 | Magd et al. .................. | 370/395.5 |
| 2006/0187715 A1 * | 8/2006 | Narvaez et al. ........... | 365/185.24 |
| 2007/0206561 A1 * | 9/2007 | Son et al. ....................... | 370/346 |
| 2008/0101231 A1 * | 5/2008 | Lai et al. ........................ | 370/235 |
| 2010/0254709 A1 * | 10/2010 | Narvaez et al. ................. | 398/98 |

* cited by examiner

*Primary Examiner* — Kwang B Yao
*Assistant Examiner* — Jung-Jen Liu
(74) *Attorney, Agent, or Firm* — Baker Botts L.L.P.

(57) ABSTRACT

In one embodiment, a method includes storing in a QoS-enabled communication system a data structure that has a multi-level hierarchy including a physical level, a logical level, and a class level; receiving a first request for M number of services provided by the QoS-enabled communication system; in response to the first request, modifying an allocation of the logical-level nodes by mapping M class-level nodes to a first one of the logical-level nodes according to a first mapping mode of the data structure; receiving a second request for P services provided by the QoS-enabled communication system, with P being greater than M; and, in response to the second request, modifying an allocation of the logical-level nodes by mapping P class-level nodes to a second one of the logical-level nodes according to a second mapping mode of the data structure.

20 Claims, 3 Drawing Sheets

ADAPTIVE QUEUE-MANAGEMENT

TECHNICAL FIELD

This disclosure relates generally to telecommunications.

BACKGROUND

Various telecommunication networks are designed to carry services with a range of quality-of-service ("QoS") requirements for a variety of different classes of service. A network, network equipment, or a network protocol that supports QoS may agree on a traffic contract with a service requestor, client, or customer and reserve a fixed capacity in the network nodes (for example during a session establishment phase) for each class of service. In certain situations, a significant amount of QoS resources may be wasted, corrupted, lost, or inefficiently used.

DESCRIPTION OF EXAMPLE EMBODIMENTS

Overview

In one embodiment, a method includes storing in a QoS-enabled communication system a data structure that has a multi-level hierarchy including a physical level, a logical level, and a class level; receiving a first request for M number of services provided by the QoS-enabled communication system; in response to the first request, modifying an allocation of the logical-level nodes by mapping M class-level nodes to a first one of the logical-level nodes according to a first mapping mode of the data structure; receiving a second request for P services provided by the QoS-enabled communication system, with P being greater than M; and, in response to the second request, modifying an allocation of the logical-level nodes by mapping P class-level nodes to a second one of the logical-level nodes according to a second mapping mode of the data structure.

DESCRIPTION

Particular embodiments relate to adaptively managing communication resources for communication networks. In particular embodiments, a communication network may be designed to carry services with a range of quality-of-service ("QoS") requirements. The term "quality of service" or "QoS" as used herein refers to a variety of resource reservation control mechanisms that may be used by certain communication networks. For example, the resource reservation control mechanisms of particular embodiments may allocate or guarantee a certain level of performance to particular data flows. Additionally or alternatively, the resource reservation control mechanisms of particular embodiments may provide different priority to different applications, users, or data flows. Various embodiments provide an adaptive framework that defines a hierarchy of network nodes over which QoS requirements may be configured. An example hierarchy of traffic nodes is illustrated in FIG. 1.

Figure 1:
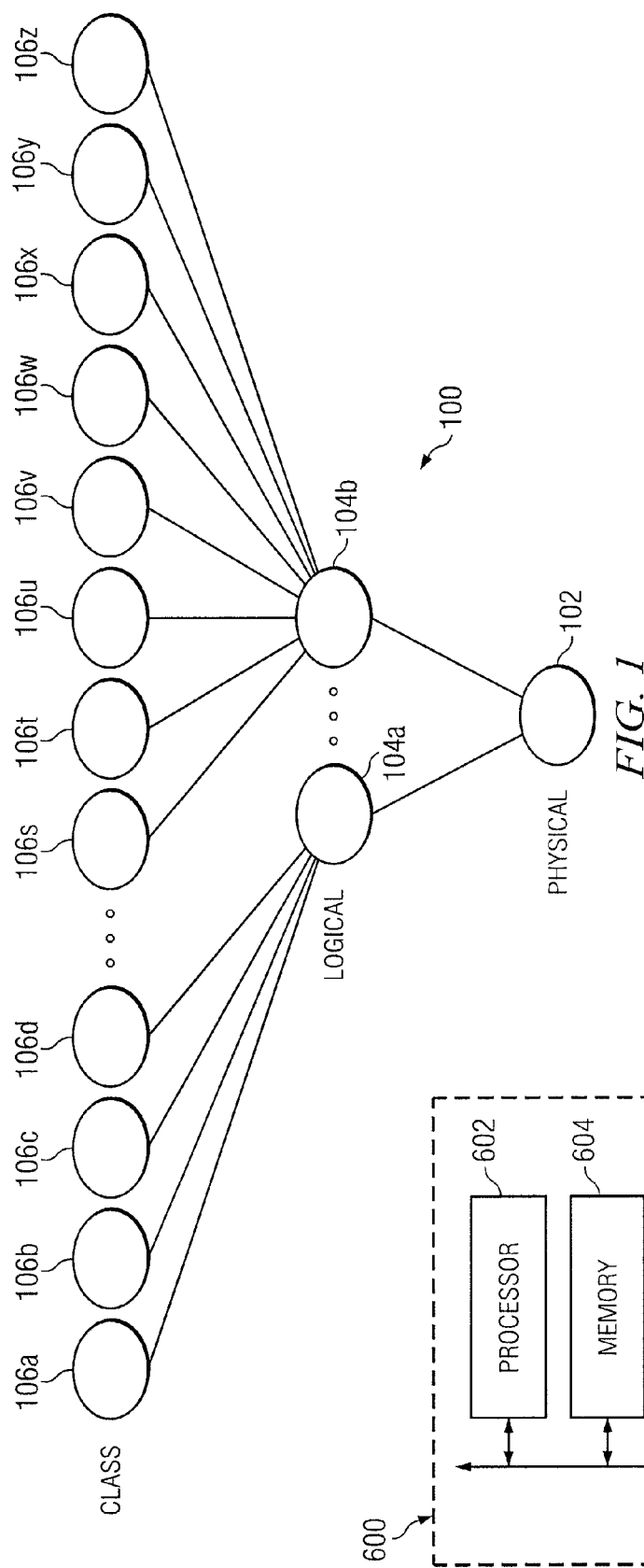
FIG. 1 illustrates an example network node hierarchy of a communication network.

FIG. 1 illustrates an example network node hierarchy 100 of a communication network. Network node hierarchy 100 generally includes three hierarchical levels: a physical level, a logical level, and a class level. The physical level is the bottom level of the illustrated portion of network node hierarchy 100. The physical level in this example includes one or more physical-level nodes 102. The logical level is an intermediate level of the illustrated portion of network node hierarchy 100. The logical level in this example includes multiple logical-level nodes 104a and 104b that are each mapped to a corresponding physical level node 102. The class level is a top level of the illustrated portion of network node hierarchy 100. The class level in this example includes multiple class-level nodes 106a, 106b, 106c, 106d, 106s, 106t, 106u, 106v, 106w, 106x, 106y, and 106z that are each mapped to a corresponding logical level node 104a or 104b. The term "mapped" as used herein generally refers to an assignment or allocation of a node at one level of network node hierarchy 100 to a node at another level of network node hierarchy 100 for a particular data queue.

One type of data queue is the collection of network nodes that are directly mapped to each other and to a particular physical-level node. As shown in FIG. 1, for example, one data queue includes network nodes 102, 104a, 106a, 106b, 106c, and 106d and another data queue includes nodes 102, 104b, 106s, 106t, 106u, 106v, 106w, 106x, 106y, and 106z. In particular embodiments, data queues may be configurable and may be able to map dynamically to any one of the network nodes according to a variety of mapping modes. Configurable data queues that may be dynamically mapped are distinguishable from static data queues that have only one fixed mode of mapping during system initialization and that remain static with respect to the one fixed mode of mapping until the end.

In a particular embodiment, physical-level nodes 102, logical-level nodes 104, or class-level nodes 106 may each be a bandwidth limited traffic flow ("BLT"). The term "BLT" as used herein generally refers to a data flow of packets, whose maximum bandwidth is constrained or limited in some manner. An example BLT of a physical-level node 102 ("physicalBLT") may include the physical interface over which traffic will be transmitted, such as, for example, the physical interface of an application-specific integrated circuit ("ASIC"), the physical interface of a router, the physical interface of another device of communication network, or any combination of the preceding. The term "router" as used herein generally refers to a network device that forwards packets to an intended destination. Various embodiments may use routers substantially similar to those manufactured by Cisco Systems. Particular physicalBLTs may be configured to schedule or shape BLTs of a corresponding logical-level node 104 ("logicalBLT"). Certain logicalBLTs may be configured to schedule or shape BLTs of a corresponding class-level node 106 ("classBLT"). Although various embodiments may include BLTs at the physical, logical, and class levels, particular embodiments may not include bandwidth limited traffic streams.

In particular embodiments, logical-level nodes 104 may include a virtual local area network ("VLAN"), a frame relay virtual circuit (VC), a Ethernet Flow Point (EFP), or other interfaces that, in some instances, may include virtual circuits. In various embodiments, each logical-level node 104 may contain, or may otherwise be assigned or guaranteed, one or more parameters or configurations related to performance of a data flow a queue through the logical-level node 104. Example parameters may include minimum bandwidth, maximum bandwidth, bit rate, delay, jitter, packet dropping probability, bit error rate, another suitable parameter or configuration related to performance of a data flow or queue, or any combination of the preceding.

In particular embodiments, each class-level node 106 may contain, or may otherwise be assigned or guaranteed, one or more parameters or configurations specific to a particular class of service of the communication network. Example classes of service may include voice (e.g., voice over IP), video, data, telepresence, Internet protocol television (IPTV), routing protocol traffic, various signaling protocols, online gaming, or any other suitable class of service enabled by the communication network.

As shown in FIG. 1, network node hierarchy 100 may include multiple modes for mapping class-level nodes 106 to logical-level nodes 104. In a first mode, for example, class-level nodes 106a, 106b, 106c, and 106d are mapped to logical-level node 104a at a 4:1 ratio. In a second mode, for example, class-level nodes 106s, 106t, 106u, 106v, 106w, 106x, 106y, and 106z are mapped to logical-level node 104b at an 8:1 ratio. Although the illustrated example includes alternative mappings of client-level nodes 106 to logical-level nodes 104 at either 4:1 or 8:1 ratios, class-level nodes 106 may be mapped to logical-level nodes 104 according to any suitable ratio. For example, alternative embodiments may map class-level nodes to logical-level nodes at ratios of 2:1, 3:1, 5:1, 8:1, 16:1, 32:1, 64:1, etc. Although FIG. 1 illustrates two different modes for mapping class-level nodes to logical-level nodes, any suitable number of mapping modes may be used (e.g., 1, 3, 4, 5, 10, etc. mapping modes). In particular embodiments, four or more mapping modes may be used, each mapping mode having a ratio of P:1, where P is a power of 2.

Figure 2:
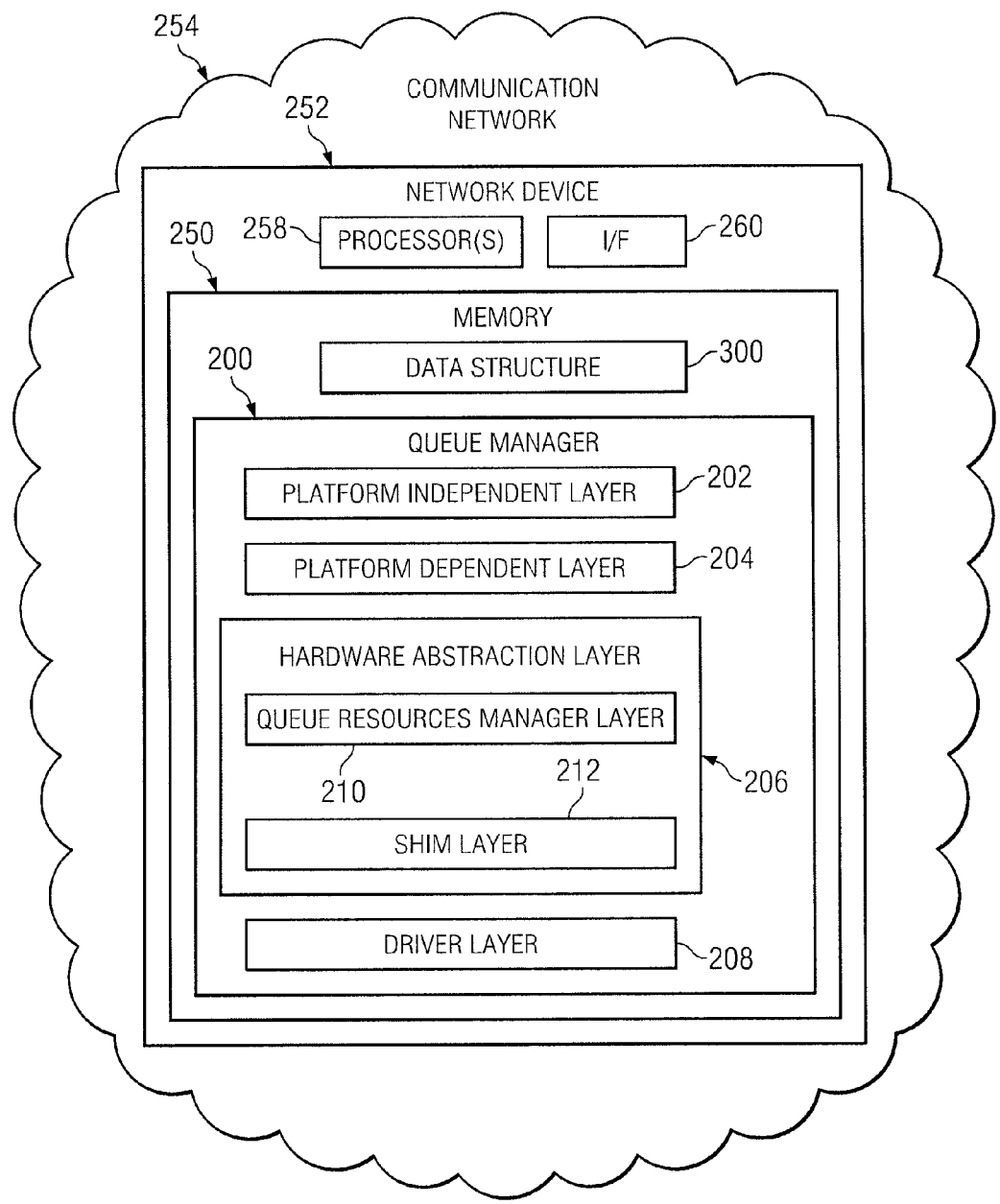
FIG. 2 illustrates an example queue manager.

FIG. 2 illustrates an example queue manager 200. In particular embodiments, at least a portion of queue manager 200 resides in program memory 250 of a network device 252 of a communication network 254. Communication network 254 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. In particular embodiments, communication network 254 may be QoS-enabled. Communication network 254 may include multiple network devices 252 that may be communicatively coupled to each other and that, in certain instances, may vary with respect to each other in structure, configuration, or function.

Network device 252 generally refers to any device or collection of devices forming a part of communication network 254. For example, network device 252 may include a directory, database, processor, router, server, ASIC chip, or any combination of the preceding. Particular network devices 252 may include a programmable machine that is at least partially implemented in hardware, software, firmware or any combination thereof. In one embodiment, network device 522 at least partially operates all or a portion of the queue hierarchies shown in FIG. 1. In particular embodiments, network device 252 implements all of the queue managing features disclosed herein.

In particular embodiments, network device 252 includes memory 250, at least one processor 258, and at least one physical interface ("I/F") 260. Processor 258 executes logic stored in program memory 250. Memory 250 is one example of a computer-readable medium. Memory 250 may include a volatile memory. Another form of computer-readable medium storing the same or substantially similar logic may be non-volatile storage, such as, for example, floppy disks, CD-ROMs, DVD-ROMs, hard disks, flash memory, or other non-volatile storage. In particular embodiments, memory 250 includes a queue manager 200 and a data structure 300, each of which is explained further below. I/F 260 may interface network device 252 with physical media. Although memory 250, processor 258, and I/F 260 are shown as at least partially residing on network device 252, in alternative embodiments all or a portion of memory 250, processor 258, or I/F 260 may be external to and accessible by network device 252.

In particular embodiments, queue manager 200 includes a platform independent adaptation layer ("PIAL") 202, a platform dependent layer ("PD") 204, a hardware abstraction layer ("HAL") 206, and a driver layer 208. In operation, queue manager 200 may adaptively manage queues of a communication network. As explained further below, the management of queues may include setting up the queues, configuring scheduler parameters, and tracking the queues in real-time. In particular embodiments, queue manager may track in real-time the particular physical-level nodes 102, logical-level nodes 104, or class-level nodes 106 that are available for allocation. In particular embodiments, queue manager 200 may access network nodes affected by an event and program/modify corresponding data structures of one or more physical network devices (e.g., shadow data structures of an ASIC chip). Although particular embodiments include layers 202, 204, 206, and 208, other embodiments may include some or none of these layers 202, 204, 206, and 208. Particular embodiments of queue manager 200 may include additional layers or modules. Additionally, queue manager 200 may include alternative configurations. For example, layers 202, 204, 206, or 208 may be internal modules of each other or of another layer (not explicitly shown).

In particular embodiments, PI 202 may be configured to interface queue manager 200 with other features of a communication network. For example, PI 202 may receive and respond to incoming requests. In particular embodiments, PI 202 may respond to incoming requests by initializing configuration changes, calling PD 204 to perform validity checks, or calling QRM 210 to create queues.

In various embodiments, PD 204 may be configured to validate features of a communication network, perform resource availability checks, create network nodes, or attach particular network nodes to corresponding mapping modes. In particular embodiments, PD 204 may call a hierarchy QoS manager ("HQM") to assign Or mark a particular node of a queue for use with a mapping mode optimized for that queue.

In this example, HAL 206 includes two internal sub-layers: a queue resources manager layer ("QRM") 210 and a shim layer 212. In particular embodiments, QRM 210 may be configured to manage queuing data structures, such as, for example, BLTs, profiles, or mapping information. In a particular embodiment, QRM 210 may process a queue-related request by modifying one or more queue-related, platform-dependent data structures and by communicating the modifications to shim layer 212 for hardware programming. In particular embodiments, QRM 210 may interface another layer or module of queue manager 200 to shim layer 212. In particular embodiments, shim layer 212 is an abstraction layer configured to translate calls from QRM 210 so that they are reader by a particular physical interface. For example, shim layer 212 may deal with ASIC details and map data structures received from QRM 210 to corresponding ASIC structures. Although QRM 210 and shim layer 212 are internal modules of HAL 206 in this example, in alternative embodiments QRM 210 or shim layer 212 may be modules external to or operationally independent of HAL 206.

In particular embodiments, driver layer 208 may manage hardware address mapping, manage software structures for the corresponding hardware resources, or perform read/write to particular data structures of physical devices (e.g., ASIC data structures). Calls to driver layer 208 may, in certain instances, be directly addressed to data structures with values.

In various embodiments, queue manager 200 may interface with or may form a part of a particular data structure comprising a stack of memory blocks. In a particular embodiment, a data strcture may be organized such that each logical-level node is located at a respective memory block of a range table. In particular embodiments, the data structure may be used to implement particular hierarchical mappings discussed previously with reference to FIG. 1. One example of a data structure that may implement multi-modal hierarchical mappings is data structure 300 illustrated in FIG. 3.

Figure 3:
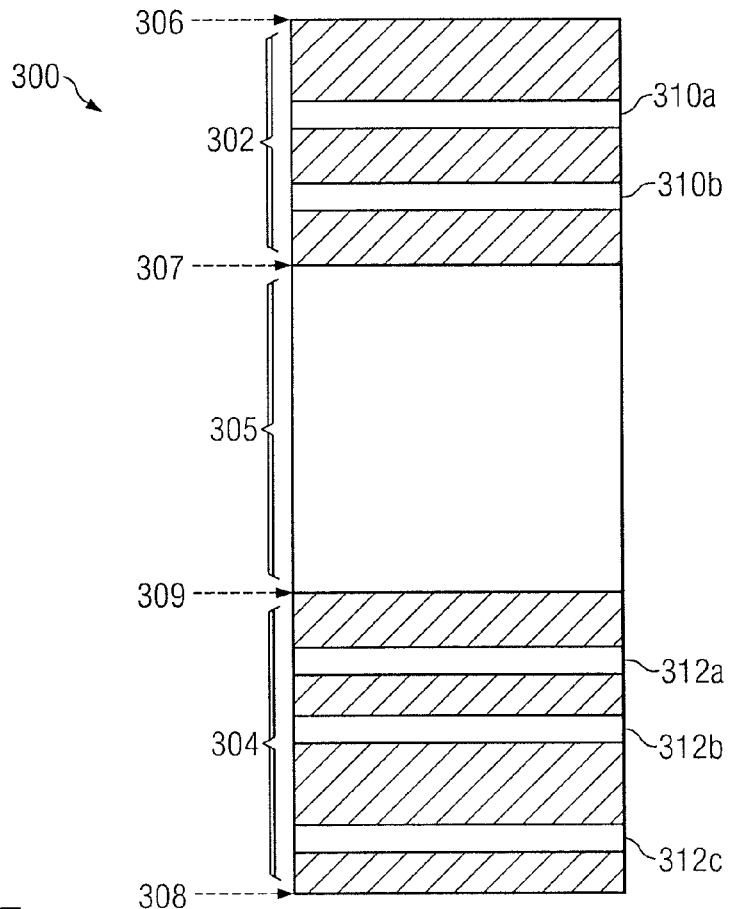
FIG. 3 illustrates a portion of an example data structure.

FIG. 3 illustrates a portion of an example data structure 300. In particular embodiments, queue manager 200 uses to data structure 300 to implement the management of data queues for communication network 254. In particular embodiments, queue manager 200 may use data structure 300 to generate or delete particular queue mappings. Additionally, queue manager 200 may use portions of data structure 300 for real-time identification of the particular physical-level nodes 102, logical-level nodes 104, or class-level nodes 106 that are free of use and available for allocation.

During operation of particular embodiments, data structure 300 may actively use portions of at least two stacks of BLT blocks corresponding to ranges 302 and 304. Range 302 may be used for hierarchical mappings according to a first mode. Range 304 may be used for hierarchical mappings according to a second mode different from the first mode.

In particular embodiments, use of multiple mapping modes may enhance efficiency of a communication network by adaptively selecting a mode for any given data queue according to the number of classes of service desired for the data queue. For example, range 302 may be used for mappings of class-level nodes 106 to logical-level nodes 104 at a ratio of 4:1 for particular data queues that have at most four classes of service. Range 304 may, for example, be used for mappings of class-level nodes 106 to logical-level nodes 104 at a ratio of 8:1 for particular data queues that have more than four and at most eight classes of service. Although this example uses at least a 4:1 mapping mode and an 8:1 mapping mode, any suitable number and type of mapping or allocation modes may be used.

One advantage of this multi-modal approach may be explained by comparing the dynamic and adaptive multi-modal approach to a static approach that is fixed at initialization and remains unchanged until the end. According to this alternative static approach, if all requests for service are mapped according to a single, fixed 8:1 ratio of class-level nodes to logical-level nodes, then implementation of a particular request for four classes of service may result in wasting or dropping half of the data (i.e. because only four class-level nodes are mapped and the static mode provided a total of eight). In contrast to the static mapping approach, particular embodiments may minimize or possibly eliminate wasted or dropped queues in certain instances by adaptively selecting a mode for each queue from multiple modes, based on the particulars of requests for service. In particular embodiments, the mapping modes may be selected using a command-line interface ("CLI").

As shown in FIG. 3, for example, queue manager 200 may select for the first time after initialization to apply a 4:1 mapping mode for a new queue. If range 302 has been allocated to the 4:1 mapping mode, queue manager 200 may effect the mapping at a block 306 at the start of range 302. For example, queue manager 200 may write data to block 306 that effects the mapping of four class-level nodes 106a, 106b, 106c, and 106d to one logical node 104a according to a 4:1 ratio. If queue manager 200 later selects the 4:1 mapping mode again for a subsequent new queue allocation request for another logical node, queue manager 200 may effect the mapping of that second queue at a block within data structure 300 that is substantially adjacent to end block 306. This process may be repeated for each new queue allocation request for another logical node created according to mapping mode 4:1, such that range 302 expands as data structure 300 implements new queues. In this example, the last queue mapped according to the 4:1 mode is effected at block 307 of range 302. Accordingly, blocks 302 and 307 define the upper and lower boundaries of range 302.

In particular embodiments, queue manager 200 may select for the first time after initialization to apply an 8:1 mapping mode for a new queue. If range 304 has been allocated to the 8:1 mapping mode, queue manager 200 may effect the mapping at a block 308 at the start of range 304. For example, queue manager 200 may use block 308 to effect the mapping of eight class-level nodes 106s, 106t, 106u, 106v, 106w, 106x, 106y, and 106z to one logical node 104b according to an 8:1 ratio. If queue manager 200 later selects the 8:1 mapping mode again for a subsequent new queue allocation request for another logical node, queue manager 200 may effect the mapping of that second queue at a block within data structure 300 that is substantially adjacent to end block 308. This process may be repeated for each new queue allocation request for another logical node created according to mapping mode 8:1, such that range 304 expands as new queues are recorded to data structure 300. In this example, the last queue mapped according to the 8:1 mode is effected at block 309 of range 304. Accordingly, blocks 304 and 309 define the upper and lower boundaries of range 304.

In certain instances, ranges 302 or 304 may use increasing percentages of data structure 300 as new queues are added. The expansion of ranges 302 and 304 may shrink the size of free blocks 305 disposed between ranges 302 and 304. At some point in time during operation, free blocks 305 may diminish in size until ranges 302 or 304 collectively use portions of data structure 300 extending substantially from block 306 to block 308. In particular embodiments, queue manager 200 may be configured to automatically adapt to the convergence of ranges 302 and 304 by using available portions of data structure 300 between any fragmented segments of ranges 302 and 304. Blocks 310a and 310b of range 302 and blocks 312a, 312b, and 312c represent portions of data structure 300 that may be available for use.

In particular embodiments, queue manager 200 may be configured to track the use of data storage 300 and identify in real-time any free blocks within ranges 302 or 304 that may be available for use. For example, as queues are deleted during operation, the corresponding blocks within range 302 or range 304 may be reset, deleted, or otherwise freed for future use. Queue manager 200 may respond to a queue deletion by determining whether the freed block is the last entry of the corresponding range 302 or 304. If the deleted block is not the last entry but rather internal to the range 302 or 304, queue manager may update one or more lists identifying the block that has been freed from prior allocation and is presently available for use. In particular embodiments, queue manager 200 may maintain a list of free blocks for each range 302 and 304. In particular embodiments, queue manager 200 may use lists of free blocks to respond to new queue requests, either before or after ranges 302 and 304 converge and free blocks 305 collapses. For example, queue manager may respond to a new queue request by first using any free blocks identified by a list for the corresponding range 302 or 304. If the list indicates no free blocks are available, then queue manager may use a block at end 307 or 309 of the corresponding range 302 or 304.

In particular embodiments, if queue manager 200 selects the 4:1 mode of range 302 for a new queue request and determines that range 302 is full (i.e. not fragmented), then queue manager 200 may respond to the new queue request by using an available block of range 304. If no blocks are available within range 304, then queue manager 200 may determine whether end 307 of range 302 may be modified to expand range 302. If no modification is available, queue manager 200 may send a resource outage notification. In another example, queue manager 200 selects the 8:1 mode of range 304 for a new queue request and determines that range 304 is full (i.e. not fragmented), then queue manager 200 may respond to the new queue request by using an available block of range 302. If no blocks are available within range 302, then queue manager 200 may determine whether end 309 of range 304 may be modified. If no modification is available, queue manager 200 may send a resource outage notification.

Particular embodiments of queue manager 200 may be configured to respond to requests to upsize a particular service request. For example, a service requestor, client, or customer may request communication network 254 to enable four classes of service. Queue manager 200 may process the request by creating a new queue according to a 4:1 mode. The creation of the new queue may include allocating a particular block X of range 302 within data structure 300. The same service requestor, client, or customer may later request communication network 254 to enable an additional four classes of service in connection with the four classes of service originally requested. In one embodiment, queue manager 200 may process the second request at least in part by: creating a new queue according to an 8:1 mode, allocating a particular block Y of range 304 within data structure 300, transferring from block X to block Y one or more parameters or configurations associated with the four originally requested classes of service, deleting or resetting block X, and updating a list to indicate block X is free of allocation and available for use. In this manner, queues created in response to service modifications may automatically inherit properties, when applicable, of related queues generated in response to former requests.

Particular embodiments of queue manager 200 may be configured to respond to requests to downsize a particular service request. For example, a service requestor, client, or customer may request communication network 254 to enable eight classes of service. Queue manager 200 may process the request by creating a new queue according to an 8:1 mode. The creation of the new queue may include allocating a particular block Z of range 304 within data structure 300. The same service requestor, client, or customer may later request communication network 254 to disable four of the eight previously requested classes of service. In one embodiment, In one embodiment, queue manager 200 may process the second request at least in part by: creating a new queue according to a 4:1 mode, allocating a particular block W of range 302 within data structure 300, transferring from block Z to block W one or more parameters or configurations associated with the four originally requested classes of service, deleting or resetting block Z, and updating a list to indicate block Z is free of allocation and available for use.

Thus, particular embodiments may simultaneously support multiple modes for mapping network nodes together. The particular mapping modes used may be chosen dynamically and may be adapted to changing requirements. Based at least in part on the particular modes chosen, particular embodiments may setup internal data structures, such that queues may be dynamically allocated from corresponding ranges. In particular embodiments, lower-ratio ranges may take precedence over higher-ratio ranges. In certain instances, different modes may share portions of the same range. Range boundaries may be adaptively adjusted according to particular allocation patterns or emphasis. Under particular circumstances, any range may grow to the point that the range occupies the entire space of a data structure. The above features may be implemented seamlessly from the service requestor, client, or customer perspective, such that the requesting entity may, in certain instances, be unaware of the backend processing performed by queue manager 200.

Figure 4:
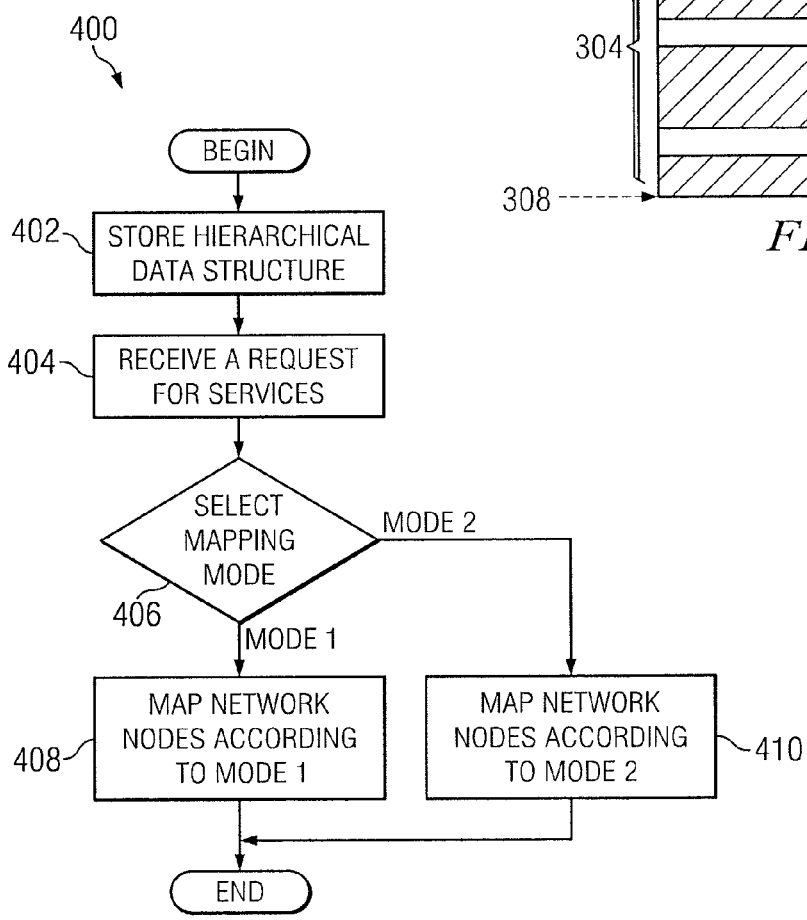
FIG. 4 illustrates an example method for adaptive queue management.

FIG. 4 illustrates an example method 400 for adaptive queue-management. The method may start at step 402, where a hierarchal data structure is stored. For example, a data structure substantially similar to data structure 300 may be stored in memory 250 (or at another suitable location) according to a hierarchical configuration substantially similar network node hierarchy 100.

At step 404, a request for services is received. In particular embodiments, the request may be transmitted by service requestor, client, or customer and received by queue manager 200 via communication network 254. In a particular embodiment, queue manager 200 may receive the request via PIAL 202. Certain requests received in step 404 may be for various classes of services to be provided by a QoS-enabled communication network.

At step 406, a mapping mode is selected. In particular embodiments, the mapping mode may be selected from among a plurality of mapping modes simultaneously enabled by a QoS-enabled communication network. Although the method of FIG. 4 includes two mappings modes (Mode 1 and Mode 2), any suitable number of mapping modes may be used. In particular embodiments, the selection of mapping modes may be based on ratio ranges, such that lower-ratio ranges may take precedence over higher-ratio ranges. In particular embodiments, each mapping mode may have a corresponding P:1 ratio that is unique with respect to the other mapping modes. The mapping mode may be selected as being the one having the smallest positive value V, with respect to the other mapping modes, for the equation $P-M=V$, where M is the number of services quested.

If a first mapping mode is selected, then network nodes are mapped to each other at step 408 according to the first mapping mode, at which point the method may end. Alternatively, if a second mapping mode is selected, then network nodes are mapped to each other at step 410 according to the second mapping, at which point the method may end. In particular embodiments, the mapping performed in step 408 or 410 may be substantially similar to the mapping discussed above. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
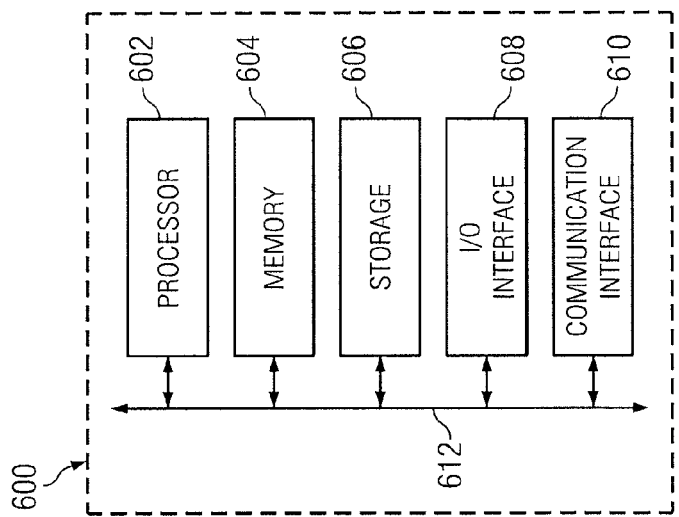
FIG. 5 illustrates an example computer system.

FIG. 5 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (e.g., another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an FIDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (e.g., packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (e.g., one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
   storing in a quality-of-service (QoS)-enabled communication system a data structure that has a multi-level hierarchy comprising:
   a physical level comprising one or more physical-level nodes, each of the physical-level nodes corresponding to a physical interface for transmitting a bandwidth-limited traffic (BLT) stream of packets;
   a logical level comprising one or more logical-level nodes, each of the logical-level nodes comprising a bandwidth-limitation parameter; and
   a class level comprising one or more class-level nodes, each of the class-level nodes corresponding to a service provided by the QoS-enabled communication system;
   receiving a first request for M number of services provided by the QoS-enabled communication system;
   in response to the first request, modifying an allocation of the logical-level nodes by mapping M class-level nodes to a first one of the logical-level nodes according to a first mapping mode of the data structure;
   receiving a second request for P services provided by the QoS-enabled communication system, P being greater than M; and
   in response to the second request, modifying an allocation of the logical-level nodes by mapping P class-level nodes to a second one of the logical-level nodes according to a second mapping mode of the data structure.

2. The method of claim 1, further comprising:
   transferring the bandwidth limitation parameter of the first one of the logical-level nodes to the second one of the logical-level nodes, the transfer being in response to the second request; and
   resetting the first one of the logical-level nodes.

3. The method of claim 2, further comprising updating a list of logical-level nodes based at least in part on the automatically resetting of the second one of the logical-level nodes, each logical-level node included in the list of logical-level nodes having no corresponding class-level node mapped to it.

4. The method of claim 1, further comprising:
   transferring the bandwidth limitation parameter of the second one of the logical-level nodes to the first one of the logical-level nodes, the transfer being in response to the first request; and
   resetting the second one of the logical-level nodes.

5. The method of claim 1, further comprising partitioning the data structure into at least first and second partitions, the first partition storing a first plurality of mappings according the first mapping mode, the second partition storing a second plurality of mappings according to the second mapping mode.

6. The method of claim 1, further comprising:
   resetting a logical-level node;
   determining the location of the reset logical-level node relative to the end of a range of memory of the data structure; and
   in response to the determination, executing one of the following steps:
   updating a variable identifying a last used logical-level node; and
   adding the reset logical-level node to a list of logical-level nodes, each logical-level node included in the list of logical-level nodes having no corresponding class-level node mapped to it.

7. The method of claim 1, wherein:
   M and P are both factors of 2; and
   the first one of the logical-level nodes comprises the second one of the logical-level nodes.

8. The method of claim 1, wherein:
   the first mapping mode ratio is a 4:1 ratio of the class-level nodes to the logical-level nodes; and
   the second mapping mode ratio is a 8:1 mapping mode ratio of the class-level nodes to the logical-level nodes.

9. One or more computer-readable non-transitory storage media embodying software this is operable when executed by one or more computer systems to:
   store in a quality-of-service (QoS)-enabled communication system a data structure that has a multi-level hierarchy comprising:
   a physical level comprising one or more physical-level nodes, each of the physical-level nodes corresponding to a physical interface for transmitting a bandwidth-limited traffic (BLT) stream of packets;
   a logical level comprising one or more logical-level nodes, each of the logical-level nodes comprising a bandwidth-limitation parameter; and
   a class level comprising one or more class-level nodes, each of the class-level nodes corresponding to a service provided by the QoS-enabled communication system;
   receive a first request for M number of services provided by the QoS-enabled communication system;
   in response to the first request, modify an allocation of the logical-level nodes by mapping M class-level nodes to a first one of the logical-level nodes according to a first mapping mode of the data structure;
   receive a second request for P services provided by the QoS-enabled communication system, P being greater than M; and
   in response to the second request, modify an allocation of the logical-level nodes by mapping P class-level nodes to a second one of the logical-level nodes according to a second mapping mode of the data structure.

10. The media of claim 9, wherein the software is further operable when executed to:
    transfer the bandwidth limitation parameter of the first one of the logical-level nodes to the second one of the logical-level nodes, the transfer being in response to the second request; and
    reset the first one of the logical-level nodes.

11. The media of claim 10, wherein the software is further operable when executed to update a list of logical-level nodes based at least in part on the automatically resetting of the second one of the logical-level nodes, each logical-level node included in the list of logical-level nodes having no corresponding class-level node mapped to it.

12. The media of claim 9, wherein the software is further operable when executed to:
    transfer the bandwidth limitation parameter of the second one of the logical-level nodes to the first one of the logical-level nodes, the transfer being in response to the first request; and
    reset the second one of the logical-level nodes.

13. The media of claim 9, wherein the software is further operable when executed to partition the data structure into at least first and second partitions, the first partition storing a first plurality of mappings according the first mapping mode, the second partition storing a second plurality of mappings according to the second mapping mode.

14. The media of claim 9, wherein the software is further operable when executed to:
reset a logical-level node;
determine the location of the reset logical-level node relative to the end of a range of memory of the data structure; and
in response to the determination, execute one of the following steps:
update a variable identifying a last used logical-level node; and
add the reset logical-level node to a list of logical-level nodes, each logical-level node included in the list of logical-level nodes having no corresponding class-level node mapped to it.

15. The media of claim 9, wherein:
M and P are both factors of 2; and
the first one of the logical-level nodes comprises the second one of the logical-level nodes.

16. The media of claim 9, wherein:
the first mapping mode ratio is a 4:1 ratio of the class-level nodes to the logical-level nodes; and
the second mapping mode ratio is a 8:1 mapping mode ratio of the class-level nodes to the logical-level nodes.

17. An apparatus comprising:
one or more communication interfaces;
one or more memory devices containing one or more instructions for execution by one or more processing devices; and
the processing devices, operable when executing the instructions to:
store in a quality-of-service (QoS)-enabled communication system a data structure that has a multi-level hierarchy comprising:
a physical level comprising one or more physical-level nodes, each of the physical-level nodes corresponding to a physical interface for transmitting a bandwidth-limited traffic (BLT) stream of packets;
a logical level comprising one or more logical-level nodes, each of the logical-level nodes comprising a bandwidth-limitation parameter; and
a class level comprising one or more class-level nodes, each of the class-level nodes corresponding to a service provided by the QoS-enabled communication system;
receive a first request for M number of services provided by the QoS-enabled communication system;
in response to the first request, modify an allocation of the logical-level nodes by mapping M class-level nodes to a first one of the logical-level nodes according to a first mapping mode of the data structure;
receive a second request for P services provided by the QoS-enabled communication system, P being greater than M; and
in response to the second request, modify an allocation of the logical-level nodes by mapping P class-level nodes to a second one of the logical-level nodes according to a second mapping mode of the data structure.

18. The apparatus of claim 17, wherein the processing devices are further operable when executing the instructions to:
transfer the bandwidth limitation parameter of the first one of the logical-level nodes to the second one of the logical-level nodes, the transfer being in response to the second request; and
reset the first one of the logical-level nodes.

19. The apparatus of claim 18, wherein the processing devices are further operable when executing the instructions to update a list of logical-level nodes based at least in part on the automatically resetting of the second one of the logical-level nodes, each logical-level node included in the list of logical-level nodes having no corresponding class-level node mapped to it.

20. The apparatus of claim 17, wherein the processing devices are further operable when executing the instructions to:
transfer the bandwidth limitation parameter of the second one of the logical-level nodes to the first one of the logical-level nodes, the transfer being in response to the first request; and
reset the second one of the logical-level nodes.

\* \* \* \* \*